UNITED STATES PATENT OFFICE.

SAMUEL B. BUSHFIELD, OF DENVER, COLORADO, ASSIGNOR OF FIVE-EIGHTHS TO ROBERT E. WATSON, W. J. SWIFT, AND CHAS. R. STAPP, OF SAME PLACE.

COFFEE COMPOUND.

SPECIFICATION forming part of Letters Patent No. 274,438, dated March 20, 1883.

Application filed January 25, 1883. (No specimens.)

*To all whom it may concern:*

Be it known that I, SAMUEL B. BUSHFIELD, a citizen of the United States, residing at Denver, in the county of Arapahoe and State of Colorado, have invented certain new and useful Improvements in Compositions of Matter, of which the following is a specification.

This invention relates to an improved composition of matter; and it has for its object to provide a preparation of coffee and other substances in a portable form, which may be readily and conveniently employed to prepare a beverage, as more fully hereinafter specified.

My improved compound consists of ground coffee, glycerine, sugar, condensed milk, and salicylic acid. These ingredients may be combined in any suitable proportions and compressed into cakes of a size for convenient use, or they may be compressed into a large cake having suitable indentations, by means of which a smaller cake or cakes may be broken off for use as required.

In practice I have found the ingredients in the following proportions to answer well for general use, viz: ground coffee, one pound; glycerine, half ounce; sugar, three ounces; condensed milk, four ounces; salicylic acid, ten grains. The ingredients are thoroughly mixed and combined and formed into cakes in suitable molds under pressure. The glycerine incorporated in the mass prevents it from becoming too dry and hard, so as to permit it to be readily and quickly disintegrated by hot water to produce a beverage when required for use, while the salicylic acid prevents any tendency to fermentation.

Having thus described my invention, what I claim, and desire to secure by Letters Patent, is—

As a new article of manufacture, the compound consisting of ground coffee, glycerine, sugar, condensed milk, and salicylic acid, in about the proportions specified.

In testimony whereof I affix my signature in presence of two witnesses.

SAMUEL B. BUSHFIELD.

Witnesses:
CHARLES D. DAVIS,
WM. D. ALEXANDER.